Patented Mar. 3, 1953

2,630,435

UNITED STATES PATENT OFFICE 2,630,435

N-BENZOHYDRYL-N-METHYL PIPERAZINES AND PROCESS OF PREPARING SAME

Richard Baltzly, New York, and Julio C. Castillo, White Plains, N. Y., assignors to Burroughs Wellcome & Co. (U. S. A.) Inc., Tuckahoe, N. Y., a corporation of New York No Drawing. Application September 9, 1948, Serial No. 48,540

12 Claims. (Cl. 260—268)

The present invention relates to N-methyl-N'-benzhydryl piperazines and has as an object to provide new compositions of the above type and a novel and improved method of making the same.

Another object is to provide new preparations of the above type having pronounced antihistaminic properties of unusually long duration.

The preparation of N-monosubstituted and N-N'-unsymmetrically disubstituted piperazines is described in Patent No. 2,436,685 of Richard Baltzly and Emil Lorz issued February 24, 1948, and Patents Nos. 2,415,785, 2,415,786 and 2,415,-787 of Johannes S. Buck and Richard Baltzly issued February 11, 1947.

We have found according to the present invention that pharmacologically active compounds are formed by treating methyl piperazine with a benzhydryl halide, either containing a substituent in the para position or being entirely unsubstituted in one phenyl and containing as many as two substituents selected from the same class in the other phenyl. The resulting N—N' unsymmetrically substituted piperazines may be characterized by the formula

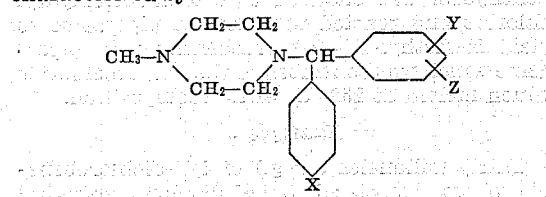

wherein X is selected from the class consisting of hydrogen, the methyl radical, chlorine and bromine, Y is a member of the class consisting of hydrogen, chlorine and bromine, and Z is a member of the class consisting of chlorine and hydrogen. The para-substituted derivatives are particularly effective.

The N-methyl-N'-benzhydryl piperazines corresponding to the above formula are bases and are usually isolated and handled as salts. Various acids of a non-oxidizing and non-toxic nature such as hydrochloric, hydrobromic, sulfuric, phosphoric, lactic, malic, succinic, and the like may be used to recover the base from the medium in which it is extracted from the reaction mixture. The nature of the anion in the particular salt is apparently immaterial with respect to the physiological behavior of the compound, and, accordingly, these salts may be considered as equivalents. A major consideration in the selection of a suitable salt is its toxicity, and, accordingly, all salts having the requisite properties may be considered within the scope of the invention. Most of the salts of these compounds are rather high-melting and their fusion is accompanied in most if not all cases by decomposition. For this reason, the observed melting points are somewhat dependent on the rate of heating and the technique of the operator.

The compounds of the present invention are conveniently prepared by treating methyl piperazine with a selected benzhydryl halide, extracting the product with a nonpolar solvent and treating the resulting solution with an acid to recover the N-methyl-N'-benzhydryl piperazine in the form of the salt. Suitable non-polar solvents for the extraction include ether, benzene, toluene, ethyl acetate and similar well known mediums. Since the benzhydryl chlorides react readily with hydroxylic solvents, including water, the reaction is best performed either without a solvent or in the presence of a non-hydroxylic solvent, such as benzene or nitrobenzene. It is usually desirable to maintain an excess of methyl piperazine during the course of the reaction and recover the unreacted methyl piperazine by appropriate procedures.

More specifically, the method according to the present invention may be carried out by mixing one equivalent of the selected benzhydryl chloride with two equivalents of methyl piperazine in the presence of a small amount of benzene and heating the mixture on a steam bath for about 4 to 8 hours. The reaction mixture may then be partitioned between ether and water and the ether layer separated and washed with additional water until the washings become neutral. This procedure results in concentrating unreacted methyl piperazine and acid formed in the reaction in the water layers and the N-methyl-N'-benzhydryl piperazine and any unreacted benzhydryl chloride or hydrolysis products thereof in the ether layer. The desired product may then be extracted from the ether layer with dilute hydrochloric acid, whereby the N-methyl-N'-benzhydryl piperazine is dissolved in the acidified aqueous solution. The latter may then be evaporated under vacuum and the N-methyl-N'-benzhydryl piperazine recovered from the residue in the form of dihydrochloride by recrystallization from suitable solvents, such as absolute ethanol or mixtures thereof with ether or ethyl acetate.

Alternatively, the acidified aqueous solution containing the dihydrochloride can be basified with concentrated sodium hydroxide solution and the base then dissolved in ether and dried over a suitable desiccant such as potassium carbonate. The base may then be purified by recrystallization from petroleum ether, distillation in high vacuum, or transformed into a salt by combination with an acid depending upon the physical properties of the particular derivative.

The new compositions are characterized by high anti-histaminic activity which remains systemically effective over an extended period of time. For example, when tested on animals periodically exposed to the action of histamine vapor, the N-methyl-N'-(4-chlorobenzhydryl) piperazine provided marked protective action twenty-four hours following administration. Furthermore, the compositions are less toxic than known histamine antagonists, and because of their prolonged activity may be given less frequently than in the case of known substances.

The following examples may serve to illustrate without limiting the scope of the invention:

Example 1

One tenth mole (20 g.) of benzhydryl chloride was mixed with 0.19 mole (19 g.) of N-methyl piperazine and about 10 cc. of benzene and the whole was heated on the steam-bath four hours. The contents of the flask was partitioned between ether and water, and the ethereal layer was washed with water until the washings were neutral. The base was then extracted from the ethereal layer by N hydrochloric acid and the extract, made acid to Congo-red paper, was evaporated under vacuum. 29.5 g. of the pure dihydrochloride of N-methyl-N'-benzhydryl piperazine was recovered from the residue by recrystallization from 95 percent alcohol melting above 250° C. with decomposition.

The addition of alkali to an aqueous solution of the dihydrochloride liberated the base which was recovered by recrystallization from petroleum ether melting at 105.5 to 107.5° C.

Example 2

N-methyl - N' - (4-methylbenzhydryl) piperazine was obtained by the process of Example 1 using 4-methylbenzhydryl chloride instead of benzhydryl chloride, and isolated as the maleate.

Example 3

0.08 mole (19 g.) of 4-chlorobenzhydryl chloride and 0.16 mole (16 g.) of methylpiperazine were mixed in about 20 cc. of dry benzene. The flask containing the reaction mixture was covered by a watch glass and set in the steam bath, and heating was continued for six hours. The contents of the flask was partitioned between ether and water and the ethereal layer was washed with water until the washings were neutral. The ethereal layer was extracted successively with 30 cc. and 10 cc. portions of 3 N hydrochloric acid. On evaporation of the ether layer there remained a residue of 2.5 g. The aqueous extracts were united and basified with concentrated alkali. The oily base was taken into ether and dried over potassium carbonate. On evaporation of the ether, N-methyl-N'-(4-chlorobenzhydryl) piperazine was recovered in the form of a viscous oil in 75 percent yield. The N-methyl - N' - (4-chlorobenzhydryl) piperazine was dissolved in absolute alcohol and ethanolic hydrogen chloride added in excess. The dihydrochloride crystallized on addition of absolute ether and was recrystallized from the same solvent mixture in the form of longish prisms melting at about 216° C.

Example 4

N-methyl-N'-(4 - chlorobenzhydryl piperazine was also prepared by allowing a mixture of 4-chlorobenzhydryl chloride and methyl piperazine to stand at room temperature (30° C.) for six days in nitrobenzene solution or by warming the same solution twenty hours at 60° C.

Example 5

N-methyl-N'-(2-chlorobenzhydryl) piperazine was prepared in the form of the dihydrochloride melting at 248° C. with decomposition by reacting o-chlorobenzhydryl chloride with methyl piperazine in a similar manner to Example 3.

Example 6

N-methyl-N'-(3-chlorobenzhydryl) piperazine, in the form of the dihydrochloride, melting at about 250° to 252° C. with decomposition, was prepared by reacting m-chlorobenzhydryl chloride and methyl piperazine according to the method of Example 3.

Example 7

One fortieth of a mole (6.6 g.) of p-bromobenzhydrol was dissolved in 30 cc. of benzene and hydrogen chloride gas was passed through the solution for six hours and a small amount of calcium chloride was added to absorb the water formed in the reaction. The solution was decanted from the calcium chloride and water into a flask containing a little fresh calcium chloride and the solution was resaturated with hydrogen chloride and allowed to stand overnight. The benzene solution was then evaporated under vacuum on a steam bath.

The 4-bromobenzhydryl chloride so formed did not crystallize and was reacted immediately with 0.06 mole (6 g.) of methyl piperazine in 5 cc. of benzene according to the procedure of Example 3. After the separation of the N-methyl-N'-(4-bromobenzhydryl) piperazine base from unreacted starting materials as described in Example 3, the base, in dried ethereal solution, was poured into absolute ethanol containing 2 g. of hydrogen chloride to crystallize the dihydrochloride of the base melting at about 226° C. and at 227 to 228° C. on recrystallization from ethanol-ether mixture.

Example 8

By the same procedure of Example 7, o-bromobenzhydrol was changed to o-bromobenzhydryl chloride and reacted with methyl piperazine to yield N-methyl-N'-(2-bromobenzhydryl) piperazine which was converted to the dihydrochloride which melted at 252° C. with decomposition.

Example 9

Thirty millimoles (7.5 g.) of 4,4'-dichlorobenzhydrol was converted to 4,4'-dichlorobenzhydryl chloride and the latter reacted with 6 g. of methyl piperazine by the method of Example 7, and the product in the form of the dihydrochloride of N-methyl-N'-(4,4'-dichlorobenzhydryl) piperazine crystallized from an ethanol and ether mixture. This salt decomposes at about 260°.

Example 10

By the same procedure of Example 7, 4,4'-dibromobenzhydrol was transformed into the 4,4'-dibromobenzhydryl chloride and the latter treated with methyl piperazine to yield N-methyl-N'-(4,4'-dibromobenzhydryl) piperazine.

Example 11

Similarly, 4-chloro-4'-bromobenzhydrol was changed to 4-chloro-4'-bromobenzhydryl chloride and treated with methyl piperazine to form N - methyl - N' - (4 - chloro - 4' - bromobenzhydryl) piperazine.

Example 12

Thirty millimoles (7 g.) of 4-chloro-4'-methylbenzhydrol was treated with hydrogen chloride in benzene by the method of Example 7. The resultant 4-chloro-4'-methylbenzhydryl chloride was reacted with two equivalents of methyl piperazine by the method of Example 7. The dihydrochloride of N-methyl-N'-(4-chloro-4'-methylbenzhydryl) piperazine crystallized from an ethanol-ether mixture melting at about 226° C.

Example 13

Thirty millimoles (7.5 g.) of 3,4-dichlorobenzhydrol was converted to the benzhydryl chloride by the method of Example 7 and heated ten hours with 6 g. of methyl piperazine in 5 cc. of benzene and the product recovered by the method of Example 1 in the form of the dihydrochloride of N-methyl-N'-(3,4-dichlorobenzhydryl) piperazine melting at about 238.5° to 239.5° C.

Example 14

In a similar manner, N-methyl-N'-(2,4-dichlorobenzhydryl) piperazine was prepared from 2,4 - dichlorobenzhydryl chloride and methyl piperazine.

Example 15

N - methyl - N' - (2,4-dichloro - 4' - methylbenzhydryl) piperazine dihydrobromide was prepared using hydrobromic acid in accordance with the method of Example 7.

The methods of the preceding examples were followed in preparing the following additional derivatives in accordance with the invention:

16. N - methyl - N' - (4,2' - dichlorobenzhydryl) - piperazine.
17. N - methyl - N' - (4,3' - dichlorobenzhydryl) - piperazine.
18. N - methyl - N' - (4 - chloro - 2' - bromobenzhydryl) piperazine.
19. N - methyl - N' - (4 - bromo - 2' - chlorobenzhydryl) piperazine.
20. N - methyl - N' - (4 - bromo - 3' - chlorobenzhydryl) piperazine.
21. N - methyl - N' - (4,2' - dibromobenzhydryl) - piperazine.
22. N - methyl - N' - (4,2',4' - trichlorobenzhydryl) piperazine.
23. N - methyl - N' - (4,3',4' - trichlorobenzhydryl) piperazine.
24. N - methyl - N' - (4 - bromo - 3',4' - dichlorobenzhydryl) piperazine.
25. N - methyl - N' - (4 - bromo - 2',4' - dichlorobenzhydryl) piperazine.
26. N - methyl - N' - (4 - bromo - 4' - methylbenzhydryl) piperazine.

Since the base is the physiologically active moiety in any non-toxic salt of any compound described herein, the known non-toxic salts of these derivatives are to be regarded as equivalents of the uncombined bases described in the specification and claims herein.

We claim:

1. Compounds selected from the group consisting of those having the free base formula

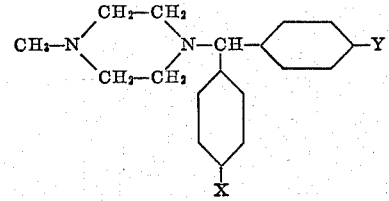

and the acid salts thereof, wherein X and Y are selected from the class consisting of hydrogen, halogen and the methyl radical.

2. A compound corresponding to the formula N - methyl - N'-(4-chlorobenzhydryl) piperazine when prepared as the free base.

3. A compound corresponding to the formula N - methyl-N'-(4-bromobenzhydryl) piperazine when prepared as the free base.

4. A compound corresponding to the formula N - methyl-N'-(4,4'-dichlorobenzhydryl) piperazine when prepared as the free base.

5. The acid salt of N-methyl-N'-benzhydryl piperazine.

6. The acid salt of N-methyl-N'-(4-chlorobenzhydryl) piperazine.

7. The method of preparing N,N' substituted piperazine which comprises treating N-methyl piperazine with 4-chlorobenzhydryl chloride and recovering the N-methyl-N'-(4-chlorobenzhydryl) piperazine.

8. The method of preparing N,N' substituted piperazines which comprises treating N-methyl piperazine with a benzhydryl halide of the formula

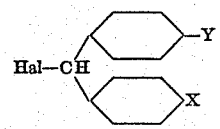

wherein X is selected from the class consisting of hydrogen, the methyl radical, chlorine and bromine and Y is a member of the class consisting of hydrogen, chlorine and bromine, and recovering the N-methyl-N'-benzhydryl substituted piperazine.

9. The method of preparing N,N' substituted piperazines which comprises treating methyl piperazine with a benzhydryl halide of the formula

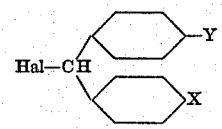

wherein X is selected from the class consisting of hydrogen, the methyl radical, chlorine and bromine and Y is a member of the class consisting of hydrogen, chlorine and bromine, partitioning the reaction mixture between the non-polar solvent and water, and treating the resulting solution of the non-polar solvent with an acid to recover the N-methyl-N'-benzhydryl piperazine in the form of a salt.

10. The method of preparing N,N' substituted piperazines which comprises treating N-methyl piperazine with a benzhydryl chloride of the formula

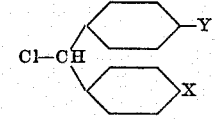

wherein X is selected from the class consisting of hydrogen, the methyl radical, chlorine and bromine and Y is a member of the class consisting of hydrogen, chlorine and bromine, in benzene solution at a temperature of from about 80° to 100° C., and recovering the N,N' substituted piperazine.

11. The method of preparing N,N' substituted piperazines which comprises heating N-methyl piperazine with a benzhydryl halide of the formula

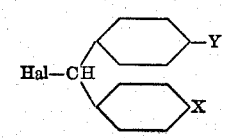

wherein X is selected from the class consisting of hydrogen, the methyl radical, chlorine and bromine and Y is a member of the class consisting of hydrogen, chlorine and bromine, at a temperature of from about 80° to about 100° C. for a period of from four to twenty-four hours and recovering the N,N′ substituted piperazine.

12. The method of preparing N,N′ substituted piperazines which comprises treating N-methyl piperazine halide of the formula

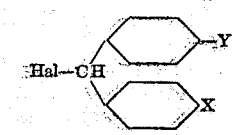

wherein X is selected from the class consisting of hydrogen, the methyl radical, chlorine and bromine and Y is a member of the class consisting of hydrogen, chlorine and bromine, in nitrobenzene at a temperature of from about 20° to about 60° C. and recovering the N,N′ substituted piperazine.

RICHARD BALTZLY.
JULIO C. CASTILLO.

No references cited.